(12) United States Patent
Brunnert

(10) Patent No.: US 8,606,469 B2
(45) Date of Patent: Dec. 10, 2013

(54) METHOD AND DEVICE FOR CONTROLLING AN AGRICULTURAL WORKING MACHINE

(75) Inventor: Andreas Brunnert, Delbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1475 days.

(21) Appl. No.: 11/690,199

(22) Filed: Mar. 23, 2007

(65) Prior Publication Data

US 2007/0179704 A1 Aug. 2, 2007

Related U.S. Application Data

(62) Division of application No. 11/148,113, filed on Jun. 8, 2005, now abandoned.

(30) Foreign Application Priority Data

Jun. 28, 2004 (DE) ...................... 10 2004 031 211.7

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |

(52) U.S. Cl.
USPC .................................. 701/50; 701/1; 701/400

(58) Field of Classification Search
None
See application file for complete search history.

(56) References Cited

U.S. PATENT DOCUMENTS

| | | | | | |
|---|---|---|---|---|---|
| 3,343,501 | A | * | 9/1967 | Banderet | 104/244.1 |
| 5,606,850 | A | * | 3/1997 | Nakamura | 56/10.2 A |
| 5,957,304 | A | * | 9/1999 | Dawson | 209/552 |
| 6,128,574 | A | * | 10/2000 | Diekhans | 701/410 |
| 6,708,080 | B2 | * | 3/2004 | Benneweis | 700/242 |
| 6,915,197 | B2 | * | 7/2005 | Van der Lely | 701/50 |
| 7,725,233 | B2 | * | 5/2010 | Hendrickson et al. | 701/50 |
| 2007/0179704 | A1 | * | 8/2007 | Brunnert | 701/200 |

* cited by examiner

*Primary Examiner* — Bhavesh V Amin
(74) *Attorney, Agent, or Firm* — Michael J. Striker

(57) ABSTRACT

A method for controlling an agricultural working machine includes the step of assigning a route planning system (7) to the agricultural working machine (2) for generating driving routes (8) in a territory (1). The route planning system (7) subdivides the territory (1) into a worked territory (13) and a remaining territory area (14), and at least one parameter (17) of the agricultural working machine (2) is adapted as a function of the shape of the worked territory (13) and/or the remaining territory area (14). In this manner it is ensured that the working method of the agricultural working machine (2) or its working attachments (6) is adaptable to the shape of the particular territory (13, 14) to ensure economically efficient use of the agricultural working machine (2). A device for controlling an agricultural working machine also is provided.

6 Claims, 3 Drawing Sheets ent Application Ser. No. 11/148,113 under 35 USC 120.
METHOD AND DEVICE FOR CONTROLLING AN AGRICULTURAL WORKING MACHINE

CROSS-REFERENCE

This is a division of U.S. patent application Ser. No. 11/148,113 filed on Jun. 8, 2005. The invention disclosed and claimed in this application claims the benefit of priority from patent application Ser. No. 11/148,113 under 35 USC 120.

The invention described and claimed below and in patent application Ser. No. 11/148,113, also is disclosed in German Patent Application DE 10 2004 031 211.7 filed on Jun. 28, 2004, which provides the basis for a claim of priority of invention under 35 USC 119(a)-(d).

BACKGROUND OF THE INVENTION

The present invention relates to a method and a device for controlling an agricultural working machine. EP 0 660 660 discloses equipping agricultural working machines with "GPS" systems to record the position of the agricultural harvesting machine in an area to be worked. In this process, the operator of the machine determined the route to be driven, and the GPS system-that is actively connected to a recording unit-delivered the position data of the vehicle, which were then used in the recording unit to electronically depict the driving path that had been covered. Systems of this type were an initial step in the direction toward recording driving routes, whereby the initial application was only to record driving routes. It was not possible to use systems of this type to perform advance planning of driving routes to be worked.

Building logically on the idea of displaying driving routes, systems as described in EP 0 821 296 enable the generation of driving routes as a function of external geometries of agricultural useful areas to be worked. The main advantage of these systems is that, for the first time, driving routes can be determined in advance with consideration for diverse optimization criteria, which, in the simplest case, are subsequently processed automatically by the agricultural working machine. Based on the fact that driving paths were defined in advance based on simple geometric interrelationships, systems of this type are only capable of subdividing the territory to be worked into these driving paths as a function of the working width of the agricultural working machine. Since the width of a territory to be worked is usually not a whole-number multiple of the working width of the agricultural working machine, route planning systems of this type are also used to work driving paths that require only a portion of the possible working width of the working machine. In the least favorable case, the situation can occur in which a great deal of effort-namely skillful maneuvering by the operator of the agricultural working machine-is required to work calculated driving paths in the edge regions, or, when substances are applied, such as fertilizer or herbicides, the situation can occur in which the particular substance is applied multiple times to the same partial areas of the territory to be worked. This results in increased costs due to an unnecessarily excessive application of the substance and, in the least favorable case, the multiple applications can also damage the plants.

SUMMARY OF THE INVENTION

The object of the present invention, therefore, is to propose a route planning system that avoids the disadvantages of the related art described above, and to ensure economically efficient use of the agricultural working machine on the territory to be worked.

Due to the fact that a parameter of the agricultural working machine is adapted as a function of the shape of a worked territory and/or a remaining territory area, it is ensured that the working method of the agricultural working machine or its working attachment is adaptable to the shape of the particular territory to ensure economically efficient use of the agricultural working machine.

An advantageous further development of the present invention results when the agricultural working machine is a carrier vehicle with adapted working attachments, and the parameters capable of being adapted as a function of the shape of the territory to be worked can be parameters of the carrier vehicle and the working attachments. With this, a great deal of flexibility in the optimization of the economic efficiency is achieved, since, depending on the type of agricultural working machine, individual working attachments can be moved from an operating position into a non-operating position, or working attachments that are not required can be simply shut off but not moved out of the way.

In the simplest case, the changeable parameter can include the orientation of the agricultural working machine or the working attachment adapted to the shape of the worked territory and/or the remaining territory area. The orientation can be the diagonal position of the agricultural working machine and its working attachments, or the adjustment of partial working widths. This has the advantages, in particular, that better use is made of the working width of the agricultural working machine, and repeated working of the same territory is prevented.

In a manner with a particularly simple design, the adjustment of partial working widths is realizable by switching individual working devices on and off.

The agricultural working machine is usually moved to a new territory after it has been used to work a territory, and it is typically moved at a faster driving speed than it traveled when working the territory. The same applies for moving from a driving route after working it to the next driving route to be worked. In an advantageous further development, the driving speed of the agricultural working machine can be changed immediately when the size of the remaining territory area is zero, i.e., when the working of the territory that, in the simplest case, can even be a single driving route, has therefore been completed.

In another advantageous further development of the present invention, the parameter capable of being changed as a function of the shape of the worked territory or the remaining territory area can include the activation of predefined working sequences. This has the advantage, in particular, that repeating working sequences are always triggered automatically at certain places in the territory, e.g., at the end of a driving route. These predefined working sequences can be "turn-around management" in particular, whereby, in the simplest case, the shape of the remaining territory area can also be defined such that it is the shape of a driving route to be worked that remains.

The activation of working devices such as the orientation of devices that transfer harvested crops depends decisively on the shape of the worked territory or the remaining territory area in such a manner that, e.g., hauling vehicles can be positioned only at certain places on the territory due to limited space. In an advantageous further development of the present invention, the changeable parameter can now include the right-or left-side orientation of working devices, so that actions to be carried out by the operator in particular to carry out hand-over processes can be reduced considerably.

Given that the shape of the remaining territory area is known, the agricultural working machine also has qualitative information about the remaining power requirement. In an advantageous further development of the present invention, said information can be used to adapt the rotational speed of the engine of the agricultural working machine and/or the rotational speed of the various drives of the agricultural working machine or the adapted working devices to this remaining power requirement.

An implementation of the method according to the present invention with a particularly simple design results when at least one arithmetic and control unit is assigned to the route planning system that generates actuating signals for adjusting at least one parameter of the agricultural working machine as a function of the generated driving routes and this at least one parameter is determined as a function of the shape of a worked territory and/or a remaining territory area.

The job of the operator of the agricultural working machine is made even easier when the arithmetic and control unit induces the automatic adaptation of the determined parameter to the agricultural working machine.

To enable the operator to influence the adaptation of the determined parameter, an advantageous further development of the present invention provides that the determined parameter is displayed to the operator using a display unit.

DETAILED DESCRIPTION OF THE PREFERRED EMBODIMENTS

Figure 1:
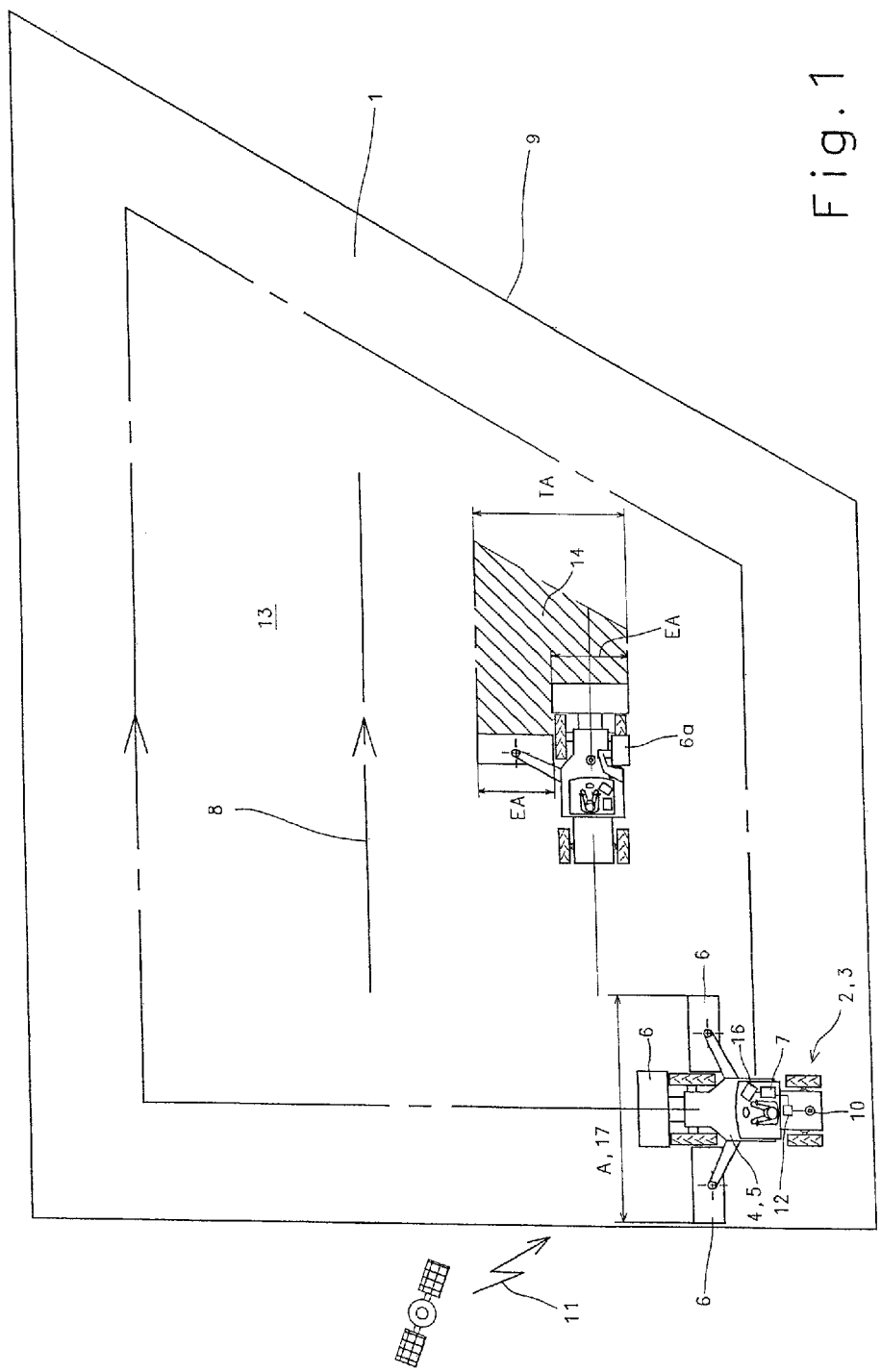
FIG. 1 shows a schematic illustration of the method according to the present invention.

FIG. 1 shows a schematic illustration of a territory 1 to be worked, said territory being driven over and worked by an agricultural working machine 2 designed as a self-propelled mower mechanism 3. The self-propelled mower mechanism 3 is a carrier vehicle 4 which, in the simplest case, can be designed as a tractor 5, to the front and sides of which working attachments 6 designed as mowing units are assigned. In addition, the agricultural working machine 2 includes a route planning system 7 known per se that is capable of subdividing territory 1 to be worked into "driving routes" 8 to be worked by the agricultural working machine 2. These driving routes 8 are usually generated in a first working step by the agricultural working machine 2 first driving around the territory 1 to be worked, following outer contours 9, so that the route planning system 7 can then determine further driving routes 8 as a function of working width A, thereby ultimately ensuring that the territory 1 to be worked is completely covered with driving routes 8 based on working width A. The route planning systems 7 of this type are typically GPS-based, since this ensures better reproducibility, whereby a GPS receiver 10 is assigned to the agricultural working machine 2, said GPS receiver transferring satellite-generated position signals 11 to a computation unit 12 coupled with the route planning system 7. The route planning system 7 is furthermore structured such that it subdivides the territory 1 to be worked into an already-worked territory 13 and a remaining territory area 14 yet to be worked, as a function of the driving routes 8 covered by the agricultural working machine 2.

The worked territory 13 and remaining territory area 14 can be visualized in a manner known per se on a display unit 16 located within viewing distance of operator 15. It is within the scope of the present invention that the remaining territory area 14 is based only on a single driving route 8. A large number of remaining territory areas 14 can therefore result within the territory 1 to be worked.

According to the illustration in the center of FIG. 1, when generated driving routes 8 are being worked by the agricultural working machine 2, the case can occur in which, e.g., the last driving route 8 to be worked has a diagonal extension that is narrower than working width A of agricultural working machine 2. In this case, the present invention now determines how to adapt at least one parameter 17-working width A in this case-to the shape of the remaining territory area 14 or, analogously, to the shape of the territory 13 to be worked. For simplicity, the shape of the remaining territory 14 in FIG. 1 was selected such that the width of the remaining territory area 14 corresponds to nearly two individual working widths EA of the mowing units 6 assigned to the carrier vehicle 4, thereby ensuring-in a manner to be described in greater detail and incorporating the route planning system 7-that the working attachments 6 of the agricultural working machine 2 are now activated only over a partial working width TA. Based on the mowing units 6 shown in FIG. 1, this means that the agricultural working machine 2 has a lower power requirement and is better able to maneuver, provided that the extra mowing unit 6a is not moved from the operating position into a non-operating position.

Figure 2:
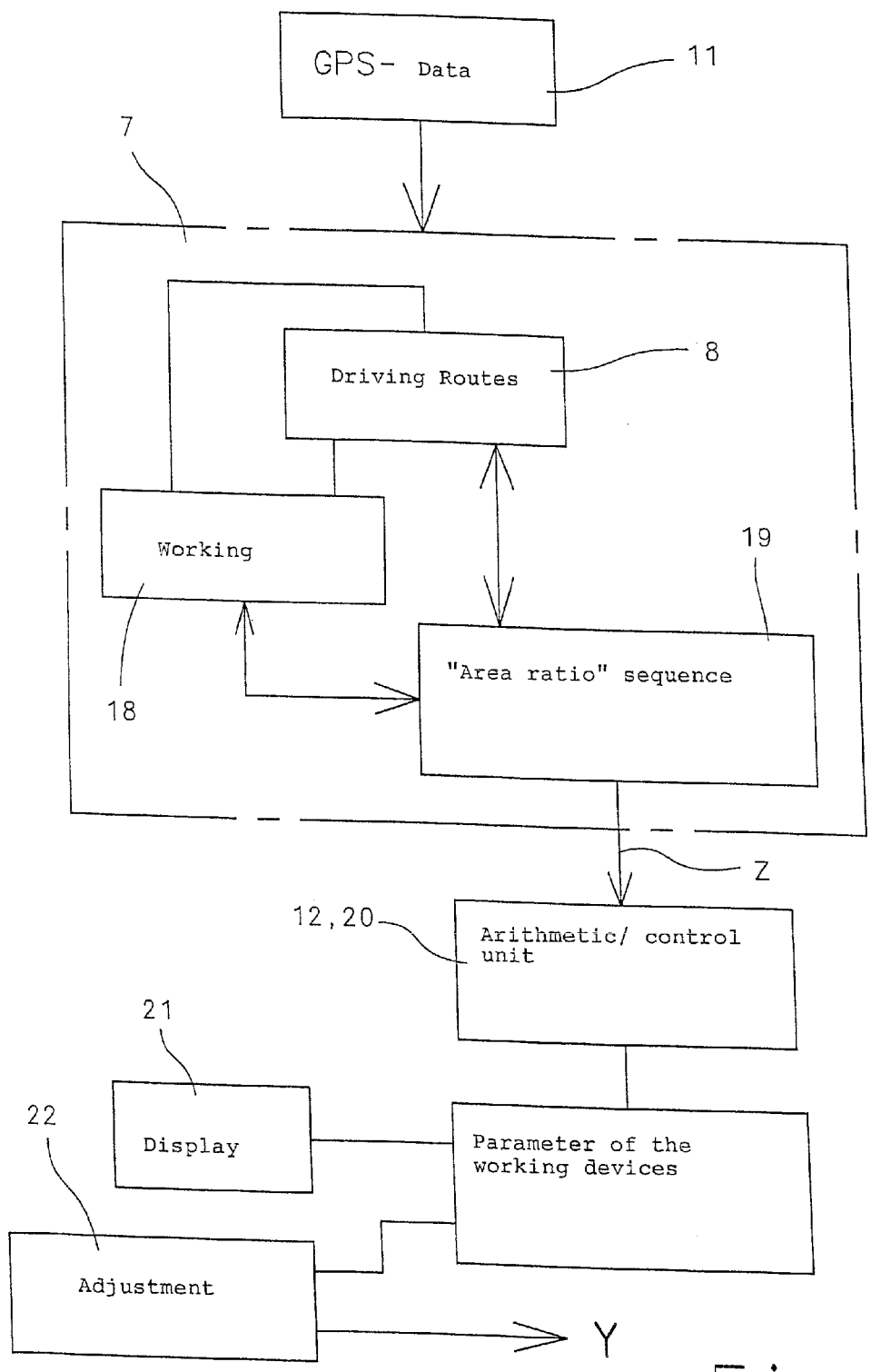
FIG. 2 shows a flow chart of the method according to the present invention.

FIG. 2 shows a schematic flow chart of the essential steps of the method according to the present invention. As described above, the route planning system 7 first generates a large number of driving routes 8 in a manner known per se and at least using GPS-based position data 11, said driving routes being recorded and stored in a program step 18 by the route planning system 7. In addition, generated and stored driving routes 8 and their working status are linked with each other by an "area ratio" sequence 19. The "Area ratio" sequence 19 determines-based on generated driving routes 8 and working status 18, and working width A of the agricultural working machine 2-the shape of territory 13 to be worked and the shape of remaining territory 14, and transfers this information in the form of power requirement signals Z to an arithmetic and control unit 20 which, in the simplest case, can be identical to the computation unit 12 of route planning system 7, which is provided anyway. Based on these power requirement signals Z which are encoding the shape of territory 13 and/or remaining territory 14 to be worked, arithmetic and control unit 20 then determines parameters 17 to be changed for the agricultural harvesting machine 2 and/or for the working attachments 6 adapted to the agricultural working machine 2, the changing of which said parameters induces an adaptation of the method of working of the agricultural working machine 2 and its working attachments 6 to the particular shape of the remaining territory area 14 or territory 13 which has already been worked. The shape of the remaining territory area 14 is usually decisive in this case. Given their direct dependence on each other, it is also within the scope of the present invention, however, to couple the changing of highly diverse parameters 17 to the shape of territory 13 that has already been worked. Parameters 17 determined by arithmetic and control unit 20 can be displayed to operator 15 using display unit 16 in a further method step 21, so that said operator can adjust the highly diverse devices on the agricultural working machine 2 or working attachment 6 adapted thereto. It is also feasible, however, that, in a further method step 22, arithmetic and control unit 20 immediately generates actuating signals Y for automatically adjusting determined parameters 17 on the agricultural working machine 2 or adapted working attachments 6.

Figure 3:
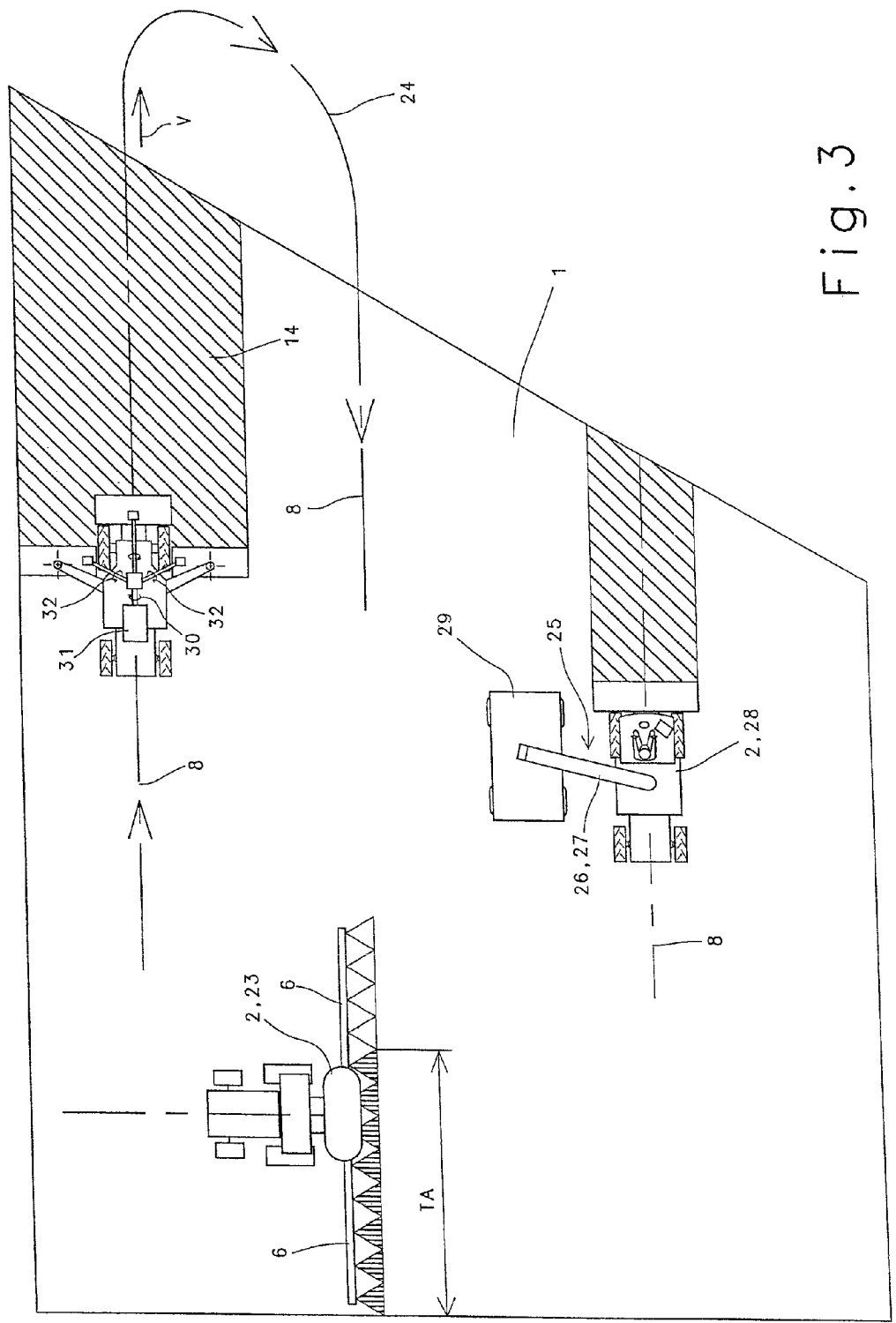
FIG. 3 shows various applications of the method according to the present invention.

According to FIG. 3, in the lower left, the agricultural working machine 2 can also be designed, e.g., as a substance-delivering working machine 23, such as a fertilizer spreader, herbicide sprayer or sowing machine, whereby operation in a partial working width TA can be carried out either by simply turning off the working attachments 6 or turning off and moving the working attachments 6 into a non-operating position. In an advantageous further development of the present invention, the parameter 17, which is changeable as a function of the shape of the remaining territory area 14, can also include driving speed v. This is an advantage, in particular, when the agricultural working machine 2 makes auxiliary drives between consecutive driving routes 8 to be worked or, after a territory 1 to be worked has been completed, moves to the next territory. In both cases, the agricultural working machine 2 is usually operated at a higher driving speed v than it is when working the plot. Furthermore, the changeable parameter 17 can include the activation of predefined and, e.g., working sequences stored in the arithmetic and control unit 20 such as "turn-around management" 24, as shown the center illustration in FIG. 3. In the simplest case, "turn-around managements" 24 of this type include lifting the working attachment 6 upon completion of working a driving route 8 and lowering the working attachment 6 when the next driving route 8 to be worked is entered. Furthermore, changeable parameter 17 can include right/left activation 25 of working devices 26, such as swiveling ejection chute 27 of the agricultural working machine 2 designed as a field chopper 28. This has the advantage in particular that the agricultural working machine 2 automatically detects-as a function of the position of the remaining territory area 14 on territory 1 to be worked-when, e.g., the unloading vehicle 29 can be located only on a certain side of the driving route 8 or remaining territory area 14 corresponding thereto, due to limited space.

The power requirement of said agricultural harvesting machine increases or decreases as a function of working width A of the agricultural harvesting machine 2. If the route planning system 7 now knows the shape of remaining territory area 14, the arithmetic and control unit 20 can also be configured such that generated actuating signals Y according to FIG. 2 adapt, e.g., the rotational speed 30 of engine 21 of the agricultural working machine 2 or rotational speeds 32 of highly diverse working attachments 6 in a manner according to the present invention. This has the advantage in particular that rotational speeds can be reduced when working in partial working widths TA, e.g., to save fuel.

It will be understood that each of the elements described above, or two or more together, may also find a useful application in other types of constructions differing from the types described above.

While the invention has been illustrated and described herein as a method and device for controlling an agricultural apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling an agricultural working machine, comprising:
  a route planning system assigned to the agricultural working machine that
    1) generates two or more driving routes in a territory,
    2) links a) the driving routes and b) a worked or non-worked status of each of the driving routes, and
    3) determines a shape of a worked territory, a remaining territory area or both by linking the driving routes, the worked or non-worked status of the driving routes and a working width of the agricultural working machine to generate a power requirement signal; and
  at least one arithmetic and control unit actively connected to the route planning system, which processes the power requirement signal to generate actuating signals and to automatically adjust parameters;
  wherein adjusting said parameters affects any of the group consisting of orientation of the agricultural working machine, orientation of a working device, a state of activation of a working device, engine speed and travel speed.

2. The device for controlling an agricultural working machine as in claim 1, wherein one of said automatically adjusted parameters affects the working width of the working attachment of the agricultural working machine in a manner than non-needed parts of the working attachment are turned off and moved from a working to a non-working position.

3. A device for controlling an agricultural working machine, comprising:
  a route planning system assigned to the agricultural working machine for generating two or more driving routes in a territory and for subdividing the territory into a worked territory and a remaining territory area;
  at least one arithmetic and control unit actively connected to the route planning system for generating actuating signals, based on the generated driving routes, a worked or non-worked status of the driving routes, wherein the actuating signals adjust at least one parameter of the agricultural working machine based on the shape of the worked territory, the remaining territory area or both;
  wherein said at least one parameter affects a working width of the agricultural working machine according to the remaining territory area.

4. The device for controlling an agricultural working machine as in claim 3, wherein said at least one parameter affecting the working width of the machine by adjusting a working width of a working attachment in a manner that non-needed parts of the working attachment are turned off and moved from a working to a non-working position.

5. The device for controlling an agricultural working machine as recited in claim 1, wherein the arithmetic and control unit automatically adapts the determined parameters.

6. The device for controlling an agricultural working machine as recited claim 1, wherein the determined parameters are visualized using a display unit.

* * * * *